(12) United States Patent
Tarlazzi et al.

(10) Patent No.: US 10,149,304 B2
(45) Date of Patent: Dec. 4, 2018

(54) OPTIMIZING NETWORK RESOURCES IN A TELECOMMUNICATIONS SYSTEM

(71) Applicant: CommScope Technologies LLC, Hickory, NC (US)

(72) Inventors: Luigi Tarlazzi, Bagnacavallo (IT); Maurice D'Souza, Plano, TX (US)

(73) Assignee: CommScope Technologies LLC, Hickory, NC (US)

( * ) Notice: Subject to any disclaimer, the term of this patent is extended or adjusted under 35 U.S.C. 154(b) by 0 days.

(21) Appl. No.: 15/120,289

(22) PCT Filed: Dec. 23, 2014

(86) PCT No.: PCT/US2014/072207
§ 371 (c)(1),
(2) Date: Aug. 19, 2016

(87) PCT Pub. No.: WO2015/126520
PCT Pub. Date: Aug. 27, 2015

(65) Prior Publication Data
US 2017/0064722 A1    Mar. 2, 2017

Related U.S. Application Data

(60) Provisional application No. 61/942,834, filed on Feb. 21, 2014.

(51) Int. Cl.
*G01R 31/08*    (2006.01)
*H04W 72/08*    (2009.01)
(Continued)

(52) U.S. Cl.
CPC ...... *H04W 72/082* (2013.01); *H04B 17/0085* (2013.01); *H04B 17/12* (2015.01);
(Continued)

(58) Field of Classification Search
USPC .................... 455/445, 447; 370/233, 252
See application file for complete search history.

(56) References Cited

U.S. PATENT DOCUMENTS

| | | | |
|---|---|---|---|
| 8,498,207 B2 * | 7/2013 | Trigui | H04L 41/5025 370/235 |
| 8,831,593 B2 | 9/2014 | Melester et al. | |

(Continued)

FOREIGN PATENT DOCUMENTS

| | | |
|---|---|---|
| EP | 1343336 | 9/2003 |
| WO | 9900999 | 1/1999 |

OTHER PUBLICATIONS

European Patent Office, "Extended European Search Report from EP Application No. 14882891.6 dated Aug. 18, 2017", "from Foreign Counterpart of U.S. Appl. No. 15/120,289", filed Aug. 18, 2017, pp. 110, Published in: EP.

(Continued)

*Primary Examiner* — David Q Nguyen
(74) *Attorney, Agent, or Firm* — Fogg & Powers LLC

(57) ABSTRACT

Certain features relate to optimizing network resources in a distributed antenna system to minimize signal interference between remote units in the distributed antenna system. A remote unit is configured to measure an isolation level with another remote unit. Based on the measured isolation level, a self-optimizing network entity can instruct base transceiver stations to partition network resources such that remote units with isolation levels lower than an isolation threshold value radiate signals using different network resources. Remote units that have isolation levels higher than an isolation threshold value can radiate signals using the same network resources. By repeating the process across multiple remote units across multiple cell-sites, signal inter- (Continued)

ference between adjacent remote units in the distributed antenna system can be minimized.

20 Claims, 6 Drawing Sheets

(51) Int. Cl.
  H04B 17/12   (2015.01)
  H04B 17/00   (2015.01)
  H04B 17/345  (2015.01)
  H04B 17/373  (2015.01)
  H04W 84/18   (2009.01)
  H04W 88/08   (2009.01)
(52) U.S. Cl.
  CPC ......... H04W 72/085 (2013.01); *H04B 17/345* (2015.01); *H04B 17/373* (2015.01); *H04W 84/18* (2013.01); *H04W 88/085* (2013.01)

(56) References Cited

U.S. PATENT DOCUMENTS

| | | |
|---|---|---|
| 9,112,547 B2 | 8/2015 | Scheinert et al. |
| 9,306,682 B2 | 4/2016 | Singh |
| 2010/0278530 A1* | 11/2010 | Kummetz ........... H04W 88/085 398/41 |
| 2011/0122788 A1* | 5/2011 | Sombrutzki ......... H04W 16/10 370/252 |
| 2011/0143806 A1 | 6/2011 | Song et al. |
| 2011/0201368 A1 | 8/2011 | Faccin et al. |
| 2011/0222525 A1 | 9/2011 | Kishigami et al. |
| 2012/0046038 A1 | 2/2012 | Gao et al. |
| 2014/0162664 A1* | 6/2014 | Stapleton ............. H04W 24/02 455/445 |
| 2015/0264582 A1 | 9/2015 | Brighenti et al. |

OTHER PUBLICATIONS

International Search Authority, "International Search Report and Written Opinion from PCT Application No. PCT/US2014/072207", dated Mar. 9, 2015, pp. 112, Published in: WO.

Trujillo et al., "Frequency-Reuse Planning of the Down-Link Distributed Antenna Systems with Maximum-Ratio-Combining (MRC) Receivers", "IEEE Latein America Transactions", Apr. 30, 2012, pp. 1-6, vol. 10, No. 3, Publisher: IEEE.

European Patent Office, "Communication Under Rule 71(3) from EP Application No. 14882891.6 dated May 11, 2018", from Foreign Counterpart of U.S. Appl. No. 15/120,289; pp. 1-37; Published in EP.

* cited by examiner

| ISOLATION [dB] @ FREQUENCY [MHz] | RU #1 | RU #2 | RU #3 | . | . | . | RU #16 |
|---|---|---|---|---|---|---|---|
| RU#1 | / | | | | | | |
| RU#2 | | / | | | | | |
| RU#3 | | | / | | | | |
| . | | | | / | | | |
| . | | | | | / | | |
| . | | | | | | / | |
| RU#16 | | | | | | | / |

FIG. 4

OPTIMIZING NETWORK RESOURCES IN A TELECOMMUNICATIONS SYSTEM

CROSS-REFERENCE TO RELATED APPLICATION

This application is a U.S. National Stage application of PCT Application Serial No. PCT/US2014/072207, filed Dec. 23, 2014 and titled "Optimizing Network Resources in a Telecommunications System," which claims the benefit of U.S. Provisional Application Ser. No. 61/942,834, filed Feb. 21, 2014 and titled "Frequency Planning in a Distributed Antenna System," the contents of all of which are incorporated herein by reference.

BACKGROUND

A telecommunications system, such as a distributed antenna system ("DAS"), can include one or more head-end units and multiple remote units coupled to each head-end unit. A DAS can be used to extend wireless coverage in an area. Head-end units can be coupled to one or more base transceiver stations that can each manage wireless communications for different cell sites. A head-end unit can receive downlink signals from the base transceiver station and distribute downlink signals in analog or digital form to one or more remote units. The remote units can transmit the downlink signals to user equipment devices within coverage areas serviced by the remote units. In the uplink direction, signals from user equipment devices may be received by the remote units. The remote units can transmit the uplink signals received from user equipment devices to the head-end unit. The head-end unit can transmit uplink signals to the serving base transceiver stations.

Adjacent remote units transmitting signals of different base transceiver stations/cells using the same network resources (e.g., transmitting at the same frequencies) can result in signal interference in the DAS.

SUMMARY

In one aspect, a method is provided. The method can include generating a test signal in a downlink band. The method can also include radiating the test signal by a first remote unit in a distributed antenna system. The method can also include receiving the signal by a second remote unit in the distributed antenna system. The method can further include determining an isolation level based on the test signal. The method can also include determining a network resource allocation plan for the first remote unit and the second remote unit based on the isolation level. The network resource allocation plan includes allocating network resources among the first remote unit and the second remote unit.

In another aspect, a non-transitory computer readable medium with program code recorded thereon is provided. The program code can include code for defining an isolation threshold indicating a minimum isolation level between a first remote unit of a distributed antenna system and a second remote unit of the distributed antenna system. The program code can also include code for determining a network resource allocation plan for the first remote unit and the second remote unit based on the isolation threshold and an isolation level provided by the first remote unit. The network resource allocation plan includes an allocation of network resources among the first remote unit and the second remote unit.

In another aspect, a distributed antenna system is provided. The distributed antenna system can include a head-end unit. The distributed antenna system can also include a first remote unit configured to measure a power level of a test signal received from a second remote unit and determine an isolation level based on the power level. The first remote unit and the second remote unit are communicatively coupled to the head-end unit.

The distributed antenna system can also include a self-optimizing network entity communicatively coupled to the head-end unit. The self-optimizing network entity determines a network resource allocation plan for the first remote unit and the second remote unit based on the isolation level. The network resource allocation plan includes an allocation of network resources between the first remote unit and the second remote unit.

BRIEF DESCRIPTION OF THE DRAWINGS

FIG. 4 is a table that can store power isolation measurements between remote units according to one aspect of the present disclosure.

DETAILED DESCRIPTION

Certain aspects and features relate to optimizing the use of network resources in a telecommunications system to minimize signal interference between two or more components within the system. For example, a pair of remote units in a distributed antenna system ("DAS") can measure signal isolation levels that can indicate the amount of signal interference between the remote units at a given frequency. A self-optimizing network ("SON") entity within the DAS can use the measured isolation levels to determine whether the two remote units should be set to radiate signals using the same network resources or different network resources. By repeating the analysis among multiple remote units in the DAS, the SON entity can optimize the available network resources to achieve desired performance characteristics, such as lower inter-cell interference within the DAS.

Optimizing available network resources in the DAS can improve the overall performance of the DAS. For example, certain wireless service areas, such as wireless service areas in rural regions, may have a substantial portion of user equipment devices located at the edges of the cell sites. Optimizing available network resources by limiting signal interference among remote units at the edges of cell sites can improve the overall reliability of network connection and reduce network latency for the user equipment devices. Network resources can be optimized in this manner for any network that uses frequency re-use technologies, such as LTE.

Optimizing the network resources in the DAS can also improve the spectral efficiency within each cell. For example, a telecommunications system can have limited bandwidth available for transmission of information between different components of the system. By efficiently re-using network resources among remote units that have high signal isolation levels, more information can be transmitted through the system, which can result in faster connections and higher data rates for user equipment devices.

These illustrative examples are given to introduce the reader to the general subject matter discussed here and are not intended to limit the scope of the disclosed concepts. The following sections describe various additional aspects and examples with reference to the drawings in which like numerals indicate like elements, and directional descriptions are used to describe the illustrative examples but, like the illustrative examples, should not be used to limit the present disclosure.

Figure 1:
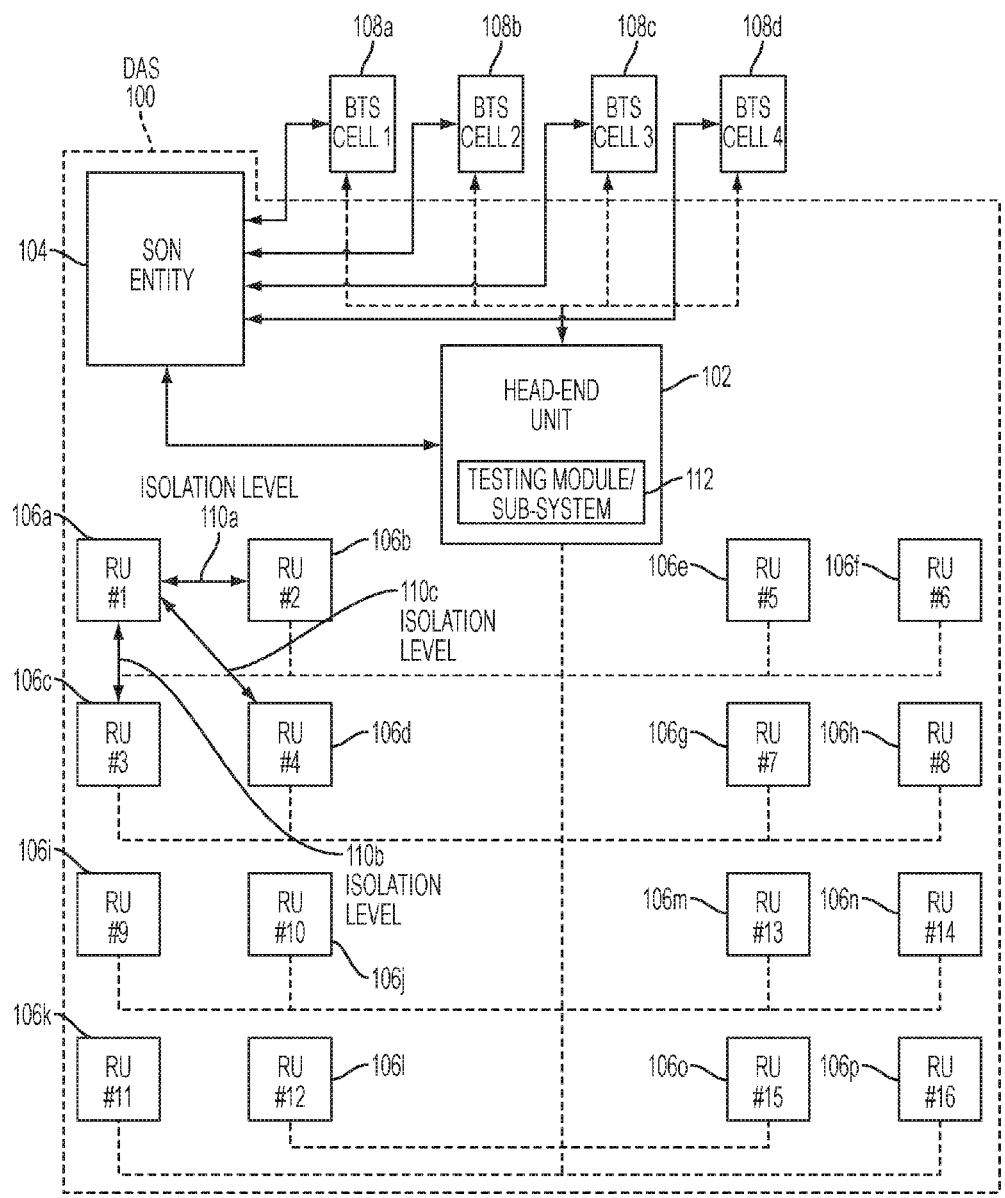
FIG. 1 is a block diagram of an example of a distributed antenna system ("DAS") configured to optimize network resources according to one aspect of the present disclosure.

FIG. 1 shows an example of a DAS 100 that can optimize frequency use in the network according to aspects and features of the subject matter described herein. The DAS 100 can include a SON entity 104 communicatively coupled to a head-end unit 102. The head-end unit 102 can include a testing module/sub-system 112. The head-end unit 102 and SON entity 104 can communicate with base transceiver stations 108a-d. Each of the base transceiver stations 108a-d can be responsible for managing cellular communications for remote units of different cell sites. For example, remote units 106a-d (labeled as "RU" in FIG. 1) can be part of a first cell site and associated with base transceiver station 108a, remote units 106e-h can be part of a second cell site and associated with base transceiver station 108b, remote units 106i-l can be part of a third cell site and associated with base transceiver station 108c, and remote units 106m-p can be part of a fourth cell site and associated with base transceiver station 108d. Each remote unit 106a-p can provide wireless coverage within the corresponding cell site by providing wireless communication information to mobile users within the cell site.

The head-end unit 102 can receive downlink signals pertaining to wireless communication information from the base transceiver stations 108a-d and transmit uplink signals to the base transceiver stations 108a-d. Any suitable communication link can be used for communication between base transceiver stations 108a-d and the head-end unit 102. Examples of a suitable communication link include a wired link, a wireless link, a direct link, and an indirect link. A direct link can include, for example, a connection via a copper, optical fiber, or other suitable communication medium. In some aspects, the head-end unit 102 can include an external repeater or internal RF transceiver to communicate with the base transceiver stations 108a-d. In some aspects, the head-end unit 102 can combine downlink signals received from two or more base transceiver stations 108a-d. The head-end unit 102 can transmit the combined downlink signals to one or more of the remote units 106a-p.

In some aspects, the SON entity 104 and the head-end unit 102 can communicate with the base transceiver stations 108a-d via a shared Network Management System ("NMS") (not shown). The NMS can communicate to and manage aspects of the head-end unit 102 and the base transceiver stations 108a-d.

Each of the remote units 106a-p can measure the amount of over-the-air isolation with respect to one or more other remote units in the DAS 100. The testing module/sub-system 112 in the head-end unit 102 can also measure the amount of isolation between remote units 106a-p. The amount of isolation between a pair of the remote units 106a-p can indicate the amount of signal interference caused by the proximity of the remote units. A high isolation measurement can indicate low signal interference and a low isolation measurement can indicate higher signal interference. Isolation level 110a represents the amount of isolation between remote unit 106a and remote unit 106b, isolation level 110b represents the amount of isolation between remote unit 106a and remote unit 106c, and isolation level 110c represents the amount of isolation between remote unit 106a and remote unit 106d.

In addition to measuring RF power isolation, a propagation delay measurement can also be made to indicate the distance between at least two remote units. A specific test signal can be generated by one of the remote units 106a-p or by the testing module/sub-system 112. The test signal can have sufficient auto-correlation properties suitable to measure a time delay of signal propagation from at least a first remote unit to a second remote unit. The test signal can be used by a second remote unit or by the testing module/sub-system 112 to measure the propagation delay between at least two remote units. While the testing module/sub-system 112 is shown in the head-end unit 102 for illustrative purposes, in other aspects, each remote unit 106a-p can include a testing module/sub-system that functions similar to the testing module/sub-system 112 included in head-end unit 102. For example, the test signal can be generated by a testing module/sub-system included in remote units 106a-p. Remote units receiving the test signal can receive the test signal via testing module/sub-systems included in the receiving remote units.

The SON entity 104 can optimize frequency use in the DAS 100 by allocating network resources to the remote units 106a-p based on the measured isolation levels between remote units or based on the propagation delay measurements. Alternatively, the measured isolation levels and the propagation delay measurements can be used in conjunction by the SON entity 104 to apply a network allocation scheme for the remote units 106a-p. A network resource can refer to any component or signal used to carry information through the telecommunications system. One example of a network resource is a physical resource block in an LTE environment. Another example of a network resource is an orthogonal frequency-division multiplexing symbol. Network resources can also include the assignments of specific antenna ports of base transceiver stations 108a-d (e.g., assignments of the signal radiated from a given antenna port of a MIMO base transceiver station). Other network resources can also be used, such as in non-LTE or multiple carrier systems, such as multiple carriers associated to multiple sectors operating on the same frequency.

The SON entity 104 can partition network resources among the remote units 106a-p by sending a network resource allocation plan either to the head-end unit 102 or the base transceiver stations 108a-d. Any suitable communication link (e.g. Ethernet link) can be used for communicating between the SON entity 104 and the head-end unit 102 and between the SON entity 104 and the base transceiver stations 108a-d. As mentioned above, the head-end unit 102 and SON entity 104 can also communicate via a common NMS. While FIG. 1 shows SON entity 104 as a separate device from the head-end unit 102 for illustrative purposes, the SON entity 104 can also be included within the head-end unit 102 in some aspects.

Figure 2:
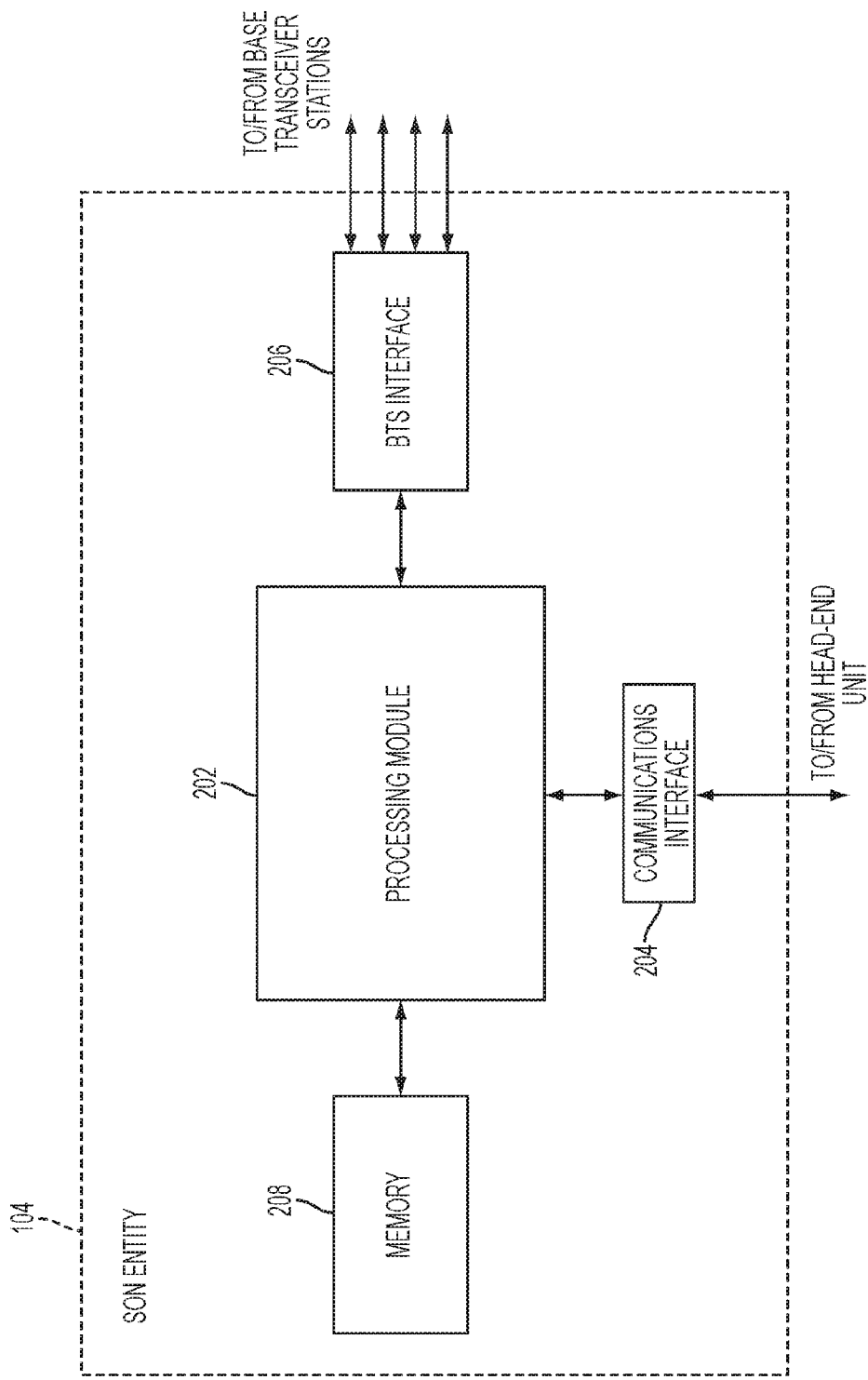
FIG. 2 is a block diagram of an example of a self-optimizing network ("SON") entity according to one aspect of the present disclosure.

Any suitable computing system or group of computing systems can be used to implement the SON entity 104. For example, FIG. 2 is a block diagram depicting an example of the SON entity 104 in DAS 100. The SON entity 104 can include a processing module 202 that is coupled to a memory 208 and that executes computer-executable program code and/or accesses information stored in the memory 208. The processing module 202 may comprise a microprocessor, an application-specific integrated circuit ("ASIC"), a field-programmable gate array ("FPGA"), or other suitable processor. The processing module 202 may include one processor or any number of processors. The processing module 202 can include or may be in communication with a computer-readable medium storing instructions that, when executed by the processing module 202, cause the processing module 202 to perform the operations described herein.

The memory 208 can include any suitable computer-readable medium. The computer-readable medium can include any electronic, optical, magnetic, or other storage device capable of providing a processor with computer-readable instructions or other program code. Non-limiting examples of a computer-readable medium include a magnetic disk, memory chip, ROM, RAM, an ASIC, a configured processor, optical storage, magnetic tape or other magnetic storage, or any other medium from which a computer processor can read instructions. The instructions may include processor-specific instructions generated by a compiler and/or an interpreter from code written in any suitable computer-programming language, including, for example, C, C++, C#, Visual Basic, Java, Python, Perl, JavaScript, and ActionScript.

The SON entity 104 can also include a communications interface 204 for communicating with the head-end unit 102. The communications interface 204 can include any suitable hardware for connecting to head-end unit 102 via a wired or wireless link. For example, communications interface 204 can include communication ports for optical fiber, Ethernet, or other suitable wired communication mediums. The communications interface 204 can also include an RF transceiver to communicate with the head-end unit 102 wirelessly. In one aspect, the communications interface 204 can include an application programming interface ("API") for interfacing with a processor in the head-end unit 102. Signals received from the head-end unit 102 can be provided to a processing module 202 via the communications interface 204. For example, isolation levels 110*a-c* sent to the head-end unit 102 can be provided to the processing module 202 via the communications interface 204.

The SON entity 104 can also include a base transceiver station interface 206 (labeled as "BTS interface" in FIG. 2) for communicating with the base transceiver stations 108*a-d*. Similar to the communications interface 204, the base transceiver station interface 206 can include any suitable hardware for connecting to base transceiver stations 108*a-d* through wired or wireless links. The base transceiver station interface 206 can also include a separate API for communicating with schedulers in base transceiver stations 108*a-d*. The base transceiver station interface 206 can also combine signals received from the base transceiver stations 108*a-d* and provide the combined signals to the processing module 202. In another aspect, the base transceiver station interface 206 can provide separate signals from each base transceiver station 108*a-d* to the processing module 202.

The SON entity 104 can communicate with remote units 106*a-p* via the head-end unit 102. The SON entity 104 can also be coupled to the testing module/sub-system 112 in the head-end unit 102. The testing module/sub-system 112 can communicate information regarding isolation level measurements among remote units and propagation delay measurements between remote units to the SON entity 104.

Isolation levels determined by the remote units 106*a-p* or the testing module/subsystem at the DAS head-end unit 102 can be provided to the SON entity 104 via the communications interface 204. Program code executed by processing module 202 can allow the SON entity 104 to determine a network resource allocation plan for the DAS 100 based on the signal isolation levels provided from remote units 106*a-p*.

Figure 3:
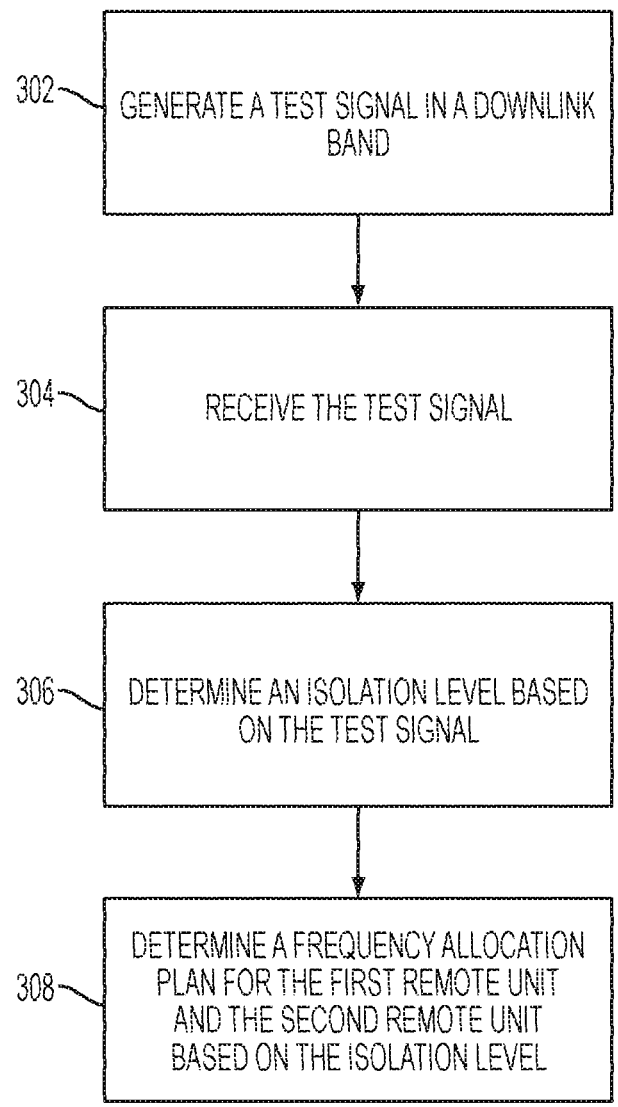
FIG. 3 is a flow chart of an example of a process for optimizing network resources in a DAS according to one aspect of the present disclosure.

FIG. 3 depicts a flowchart of a process for determining a network resource allocation plan according to one aspect of the present disclosure. In block 302, a test signal can be generated in a downlink band. For example, SON entity 104 can instruct, via a head-end unit 102, remote unit 106*b* to generate a radio frequency test tone on a specific downlink frequency of interest. In another aspect, the testing module/sub-system 112 can generate a test signal. As isolation levels between remote units can vary depending on the frequency of the signals the remote units are transmitting and receiving, the SON entity 104 can instruct remote unit 106*b* or a testing module/sub-system to generate multiple test tones on a range of frequencies in a frequency band.

The test signal can be a continuous wave ("CW") tone at a given frequency, multiple CW tones at different frequencies, one or multiple modulated/complex wideband signal of a particular radio standard (e.g. LTE). In case of CW tones the measurement receiver can simply measure the RMS (root mean square) power at each frequency. In case of modulated/complex test signals, the receiver can also demodulate the signals, including the pilot/control/synchronization tones according the specific radio standard, and measure the frequency selectivity of a wideband channel.

The SON entity 104 can use these wideband channel measurements to derive frequency-selective isolation information for allocating the resources with a higher frequency resolution.

In block 304, the test signal can be radiated. In one aspect, if remote unit 106*b* generated the test signal, then the same remote unit 106*b* can radiate the test signal to neighboring remote units. In another aspect, if the testing module/sub-system 112 generated the test signal, the testing module/sub-system 112 can provide the test signal to one or more remote units 106*a-p*, which can then radiate the test signal to neighboring remote units. The test signal can also be radiated by multiple remote units 106*a-p* simultaneously and received by multiple neighboring remote units.

In block 306 a remote unit can receive the test signal. For example, remote unit 106*a* can receive the test signal generated by the remote unit 106*b* or by the testing module/sub-system 112. The SON entity 104 can instruct the remote unit 106*a* that it will be receiving an incoming test signal. Alternatively, remote unit 106*a* can be designed to detect incoming test signals without any instruction from SON entity 104. For example, the test signal generated by remote unit 106*b* or the testing module/sub-system 112 can include control information that can inform remote unit 106*a* it is the intended recipient of the transmission and that the transmission includes a test signal for frequency planning. As such the test signal can be equivalent to a complex downlink signal of a base transceiver station and the receiving remote unit 106*a* can operate as a test mobile terminal decoding only the information intended for it. Remote unit 106*a* can receive multiple test signals of varying frequencies in a frequency band in order to determine isolation levels for each frequency of interest.

In block 308, an isolation level is determined based on the test signal. The isolation level can be determined in various ways. For example, the remote unit that received the test signal can determine the isolation level by measuring the power level of the test signal. In another aspect, the test signal can be provided to the testing module/sub-system 112, which can also measure the test signal power level to determine the isolation level. As the measured power level indicates the signal strength of the transmission, the measured power level can correspond to the isolation level in decibels. A test signal with a high power level can indicate a high isolation level, whereas a test signal with a low power level can indicate a low isolation level. The power level of the test signal can be measured via a dedicated power meter device in the remote unit that can determine the test signal power in a wide frequency range. The power level can also be measured using a spectrum analyzer or vector signal analyzer.

For example, remote units 106b-d can determine isolation levels 110a-c using the remote unit 106a. Remote unit 106a can generate a test signal in a downlink band in a given frequency and transmit the test signal to remote units 106b-d. The testing module/sub-system 112 can also generate a test signal in a downlink band, in a given frequency, provide the test signal to remote unit 106a, which can radiate the test signal to remote units 106b-d. Remote unit 106b can determine the isolation level 110a based on the measured power level of the test signal. Similarly, remote units 106c-d can determine isolation levels 110b-c, respectively, based on the measured power levels from of the test signal transmitted by remote unit 106a. Remote units 106b-d can transmit the measured isolation levels 110a-c to the SON entity 104 via head-end unit 102.

In another aspect, the DAS 100 can include a dedicated power meter or other power measuring device external to the remote units 106a-p. A dedicated power measuring device can measure the isolation levels of each remote unit pair as described above, allowing the individual remote units 106a-p to provide wireless coverage without dedicating resources to determine isolation levels. In another aspect, a central testing module/sub-system at the head-end unit 102 can measure the isolation levels of each remote unit pair.

An isolation level can also be determined via a mobile terminal walk test. A mobile terminal can generate an uplink test signal to be received and measured by one or more remote units or the central testing module/sub-system. For each mobile terminal position, the remote units can receive different power levels that are associated with the same uplink signal. The difference between these measured power levels is also an indication of the isolation level between the remote units for each position of the test mobile terminal. The SON entity 104 can also use this information to determine a network resource allocation plan for the remote units.

In another aspect, an isolation level can be determined by the mobile terminal by measuring power levels of downlink test signals transmitted by nearby remote units. For example, each remote unit can transmit a respective downlink test signal, each downlink test signal on a slightly different frequency. A mobile terminal can receive the downlink test signals from different remote units for the current position of the mobile terminal. Because each downlink test signal can be transmitted at a slightly different frequency, the mobile terminal can distinguish the received downlink test signals. The mobile terminal can measure the power levels of each received downlink test signal and record the measured power levels in a memory device. The mobile terminal can provide the measured power levels along with the position information for the mobile terminal to the SON entity 104. The SON entity 104 can use the measured power levels as reported by different mobile terminals connected to the DAS to determine a network resource allocation plan.

In block 310, a network resource allocation plan is determined for the first remote unit and the second remote unit based on the isolation level. For example, the SON entity 104 can determine a network resource allocation plan for different pairs of remote units for different frequency bands. The SON entity 104 can receive the isolation level reports from the remote units 106a-p and store the isolation level reports in a software-implemented database. For example, the SON entity 104 can store isolation level measurements in a two-dimensional software array in a non-volatile memory or random access memory. The two-dimensional software array can be visualized as a table. FIG. 4 shows an example of a table that contains power isolation measurements between remote units at a given frequency. The SON entity 104 can populate the two-dimensional array with the power isolation measurements performed by the DAS 100 for each pair of remote units 106a-p at a given carrier frequency. The same table can be defined for each carrier frequency of interest. While a two-dimensional software array is described for illustrative purposes, the SON entity 104 can implement any suitable software data structure, including a hash table or other associative array.

The SON entity 104 can use the isolation level measurements among different remote units to determine the network resource allocation plan for each remote unit pair. In one aspect, the SON entity 104 can determine different network resource allocation plans based on whether an isolation level for a remote unit pair meets a minimum isolation threshold. A minimum amount of signal isolation between two remote units for a given frequency can be defined by the SON entity 104 as an isolation threshold. The SON entity 104 can determine the isolation threshold by analyzing the layout of remote units 106a-p in the DAS 100 and comparing the various isolation levels calculated by each remote unit pair and stored in the isolation level table. The SON entity 104 can select an isolation level that falls at a certain percentile in the isolation table as the isolation threshold. For example, after comparing the isolation levels among the various remote units 106a-p, the SON entity 104 can set the isolation threshold as the isolation level that falls in the $20^{th}$ percentile in the isolation table. The SON entity 104 can be designed to select isolation thresholds at varying percentile ranges depending on the signal characteristics desired in the DAS 100.

The isolation threshold can also be pre-determined based on specific key performance indicators provided by a network management system. In other cases a statistical analysis on a large data set can be performed by the SON entity 104. The SON entity 104 can correlate isolation levels and network resource allocation plans with key performance indicators like data throughput and reported channel quality parameters, which can be sourced from the base transceiver stations using a communication interface.

If two remote units achieve an isolation level greater than the isolation threshold, then the high isolation level can signify that the remote units are spatially separated so as not to interfere with each other above an acceptable amount. A high isolation level can also indicate that the two remote units are separated through a physical barrier, such as a wall or a ceiling of a building. If two remote units have an isolation level lower than the isolation threshold, then the isolation level can signify signal interference between the remote units caused by close proximity.

When the isolation level between two remote units exceeds the isolation threshold, the network resource allocation plan determined by the SON entity 104 can include a default cell planning scheme for the remote units. By maintaining the default cell planning scheme, the SON entity does not adjust the resource allocation among the remote units and allows the base transceiver stations 108*a-d* and head-end unit 102 to use a standard defined network resource allocation plan.

Figure 5:
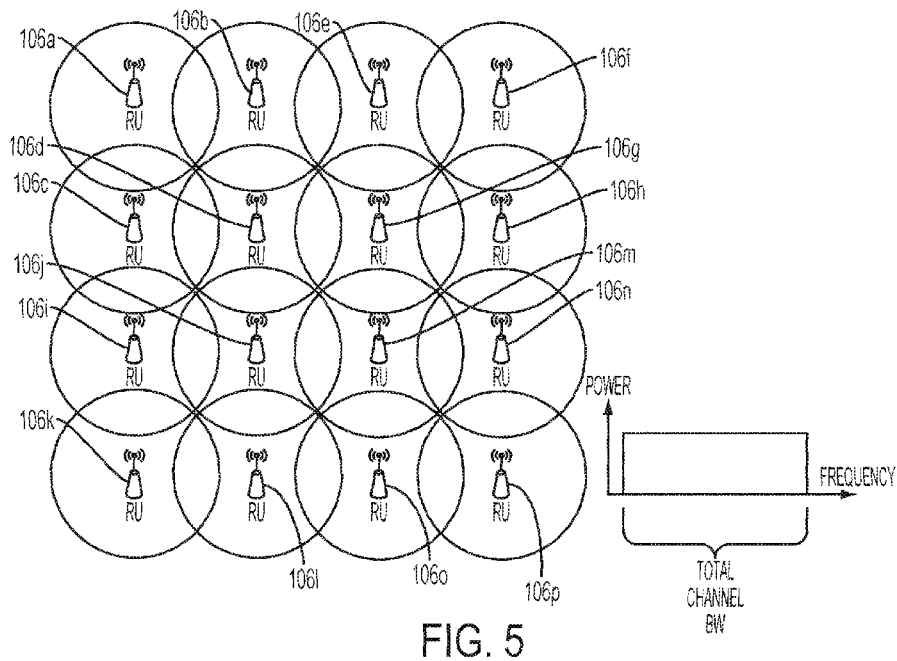
FIG. 5 is a schematic diagram of an example of a network resource allocation plan for the remote units of FIG. 1 according to one aspect of the present disclosure.

In another aspect, when the isolation level between two remote units exceeds the isolation threshold, the network resource allocation plan determined by the SON entity 104 can include a frequency re-use scheme. In a frequency re-use scheme, two remote units can radiate signals using the same network resources (e.g., instructing the two remote units to transmit on the same frequencies). Because a high isolation level was measured between the two remote units, the likelihood of signal interference is low. FIG. 5 shows an example of remote units 106*a-p* in the DAS of FIG. 1 where the network resource allocation plan includes a frequency re-use scheme. As in FIG. 1, remote units 106*a-d* can be associated with a first cell site, remote units 106*e-h* can be associated with a second cell site, remote units 106*i-l* can be associated with a third cell site, and remote units 106*m-p* can be associated with a fourth cell site. Each adjacent remote unit pair among remote units 106*a-p* can have isolation levels higher than an isolation threshold, thus allowing the SON entity 104 to allocate the same frequencies across remote units and cell sites. In this aspect, two remote units may receive different cell signals (e.g., from different base transceiver stations) using the same network resources.

Figure 6:
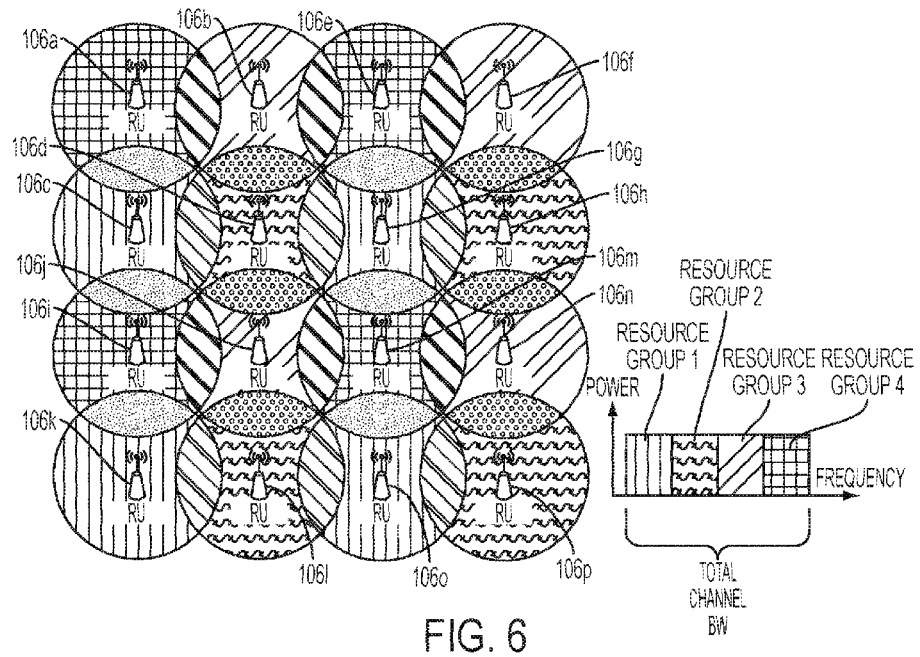
FIG. 6 is a schematic diagram of another example of a network resource allocation plan for the remote units of FIG. 1 according to one aspect of the present disclosure.

If a minimum isolation threshold is not met between two remote units, the network resource allocation plan can include an allocation of different network resources to the remote units. FIG. 6 shows an example of the remote units 106*a-p* of FIG. 1 where the isolation levels between the remote units in each cell do not meet the isolation threshold. In this example, the frequency available in the spectrum can be divided into four resource groups (shown as resource groups 1-4). Each resource group 1-4 can be associated with a given frequency or a frequency range. As remote units 106*a-b* measure an isolation level lower than the isolation threshold, remote unit 106*a* is allocated the network resources in resource group 4 and remote unit 106*b* is allocated the network resources in resource group 3. Similarly, remote units 106*c-d*, also associated with cell 1, are allocated resource groups 3 and 4, respectively. Thus, the network resource allocation plan in this example divides the network resources among each remote unit 106*a-d* (associated with the first cell site).

Resource groups 1-4 can be re-used, however, among remote unit pairs that have isolation levels higher than the isolation threshold. For example, in FIG. 4, as remote unit 106*b* is positioned between remote units 106*a*, 106*e*, remote units 106*a*, 106*e* can have a high isolation level. The network resource allocation plan can include an allocation of the network resources defined by group 4 to remote units 106*a*, 106*e*. Thus, remote units 106*a*, 106*e* share the same network resources. A similar planning scheme can be used for resource groups 1-3 and across each cell site, such that network resources are shared but no two adjacent remote units share the same network resources.

The network resource allocation plan can be implemented by sending instructions to either the base transceiver stations 108*a-d* or head-end unit 102 to partition the available network resources to different remote units according to the network resource allocation plan. The network resources can be partitioned among remote units within the same cell or among remote units of different cells. Additionally, the SON entity 104, base transceiver stations 108*a-d*, or the head-end unit 102 can instruct the remote units 106*a-p* to radiate signals only on specific network resources in accordance with the network resource allocation plan.

For example, through an API, the SON entity 104 can instruct schedulers for each base transceiver station 108*a-d* how to partition network resources among the different remote units 106*a-p* across the different cells, as well as among remote units of a given cell. For example, the SON entity 104 may instruct the scheduler of each base transceiver station 108*a-d* to use a subset of available network resources in a given cell or for a group of remote units. The scheduler and the related physical layer of each base transceiver station 108*a-d* may then generate transmit signal frames with only the selected network resources active and the other network resources inactive. Through a separate API, the SON entity 104 can instruct the head-end unit 102 to route the generated transmit signal frames to remote units 106*a-p* according to the network resource allocation plan. Alternatively, transmit signal frames may be generated by head-end unit 102. Similar to the instructions to the base transceiver stations 108*a-d* sent by the SON entity 104, the SON entity 104 can instruct the head-end unit 102 to use a subset of available network resources for specific remote units in a given cell or groups of remote units across different cells.

In another aspect, the network resources being allocated can include assignments of specific antenna ports of the base transceiver stations 108*a-d*. In this aspect, when the isolation level between two remote units exceeds the isolation threshold, the antenna ports among base transceiver stations 108*a-d* can be assigned in a co-located MIMO configuration (e.g., each antenna port of base transceiver stations 108*a-d* assigned to the same remote unit). Remote units receiving MIMO transmissions can have multiple co-located antenna ports for receiving the transmissions. When the isolation level between the two remote units is lower than the isolation threshold, the antenna ports among base transceiver stations 108*a-d* can be assigned in an interleaved MIMO configuration (e.g., different antenna ports can be assigned to different remote units). In an interleaved MIMO configuration, the receiving remote units can have a single antenna port (Single-Input Single-Output remote units).

Figure 7:
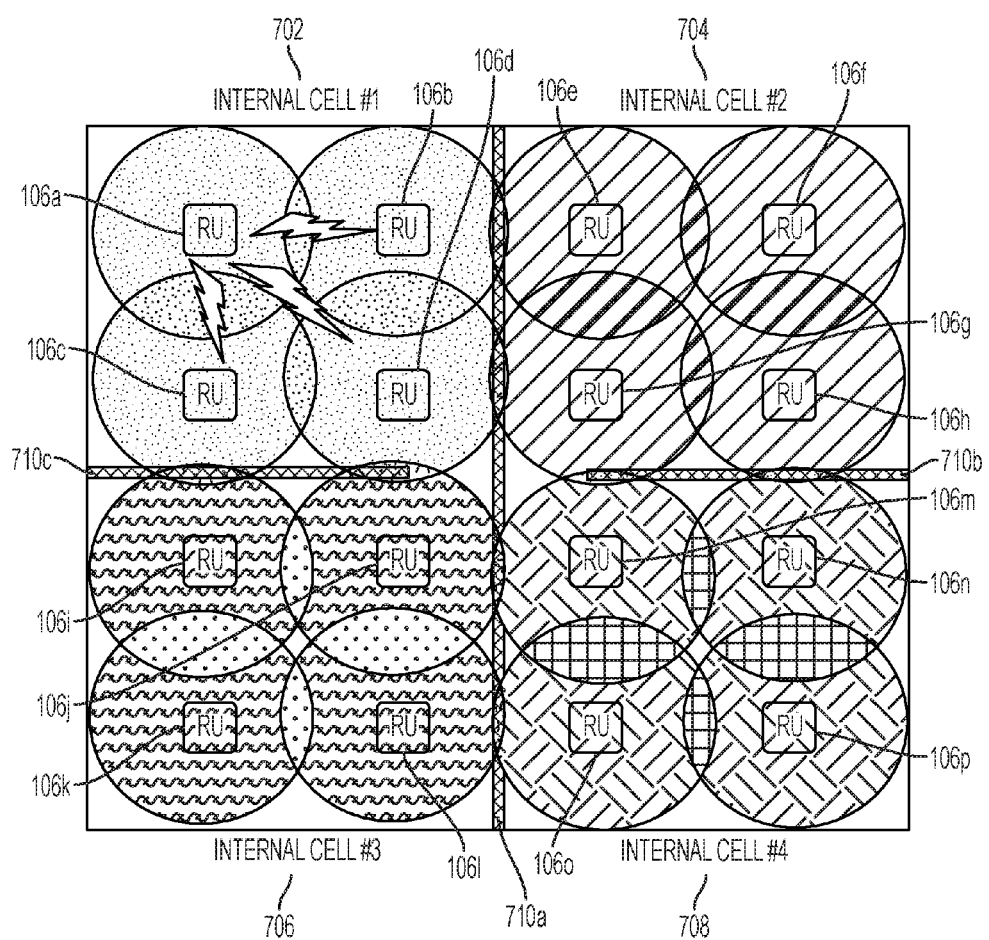
FIG. 7 is a schematic diagram of another example of a network resource allocation plan for the remote units of FIG. 1, where remote units radiate copies of cells in a simulcast mode.

In another aspect, if a minimum isolation is not met between two remote units, the SON entity 104 can assign the two remote units to a single cell. Signals from the cell can be simulcast across the two remote units by configuring the remote units to radiate copies of the same signals from the cell. For example, FIG. 7 shows an example of remote units 106*a-p* in the DAS of FIG. 1 where the network resource allocation plan includes cell simulcast schemes. The network environment shown in FIG. 7 depicts barriers 710*a-c* that can isolate signals radiated by remote units 106*a-p*. For example, signals radiated by remote units 106*a-d* can be isolated from signals radiated by remote units 106*e-p*. Similarly, signals radiated by remote units 106*e-h* can be isolated from signals radiated by remote units 106*a-d* and 106*i-p*. Signals radiated by remote units 106*i-l* can be isolated from signals radiated by remote units 106*a-h* and remote units 106*m-p*. And signals radiated by remote units 106*m-p* can be isolated from signals radiated by remote units 106*a-l*.

Minimum signal isolation may not, however, be present between remote units in a given area. For example, minimum isolation may not be met between remote 106a-d. Similarly, minimum isolation may not be met between remote units 106e-h. Minimum isolation also may not be met between remote units 106i-l. Further, minimum isolation may not be met between remote units 106m-p. In response, the SON entity 104 can assign a network resource allocation plan where remote units that do not meet the minimum isolation threshold are assigned to a single cell. For example, remote units 106a-d can be assigned to internal cell 702, remote units 106e-h can be assigned to internal cell 704, remote units 106i-l can be assigned to internal cell 706, and remote units 106m-p can be assigned to internal cell 708. Copies of signals from each cell can be radiated by the remote units assigned to the cell.

While the present subject matter has been described in detail with respect to specific aspects and features thereof, it will be appreciated that those skilled in the art, upon attaining an understanding of the foregoing may readily produce alterations to, variations of, and equivalents to such aspects and features. Accordingly, it should be understood that the present disclosure has been presented for purposes of example rather than limitation, and does not preclude inclusion of such modifications, variations and/or additions to the present subject matter as would be readily apparent to one of ordinary skill in the art.

What is claimed is:

1. A method, comprising:
    generating a test signal in a downlink band;
    radiating, by a first remote unit in a distributed antenna system, the test signal;
    receiving, by a second remote unit in the distributed antenna system, the test signal;
    determining an isolation level based on the test signal; and
    determining a network resource allocation plan for the first remote unit and the second remote unit based on the isolation level, the network resource allocation plan including an allocation of network resources among the first remote unit and the second remote unit.

2. The method of claim 1, wherein determining the isolation level includes measuring a power level of the test signal.

3. The method of claim 1, further comprising:
    defining an isolation threshold indicating a minimum isolation level between the first remote unit and the second remote unit; and
    determining whether the isolation level exceeds the isolation threshold.

4. The method of claim 3, wherein the network resource allocation plan includes a default plan when the isolation level exceeds the isolation threshold.

5. The method of claim 3, further comprising implementing the network resource allocation plan by instructing the first remote unit and the second remote unit to receive respectively different signals using the same network resources when the isolation level exceeds the isolation threshold.

6. The method of claim 3, further comprising implementing the network resource allocation plan by instructing the first remote unit and the second remote unit to radiate signals using the same network resources when the isolation level exceeds the isolation threshold.

7. The method of claim 3, further comprising implementing the network resource allocation plan by instructing the first remote unit to radiate signals using a first subset of the network resources and configuring the second remote unit to radiate signals using a second subset of the network resources when the isolation level does not exceed the isolation threshold.

8. The method of claim 7, further comprising: instructing a base transceiver station to partition the network resources among the first remote unit and the second remote unit according to the network resource allocation plan.

9. A non-transitory computer readable medium with program code recorded thereon, said program code comprising:
    program code for defining an isolation threshold indicating a minimum isolation level between a first remote unit of a distributed antenna system and a second remote unit of the distributed antenna system; and
    program code for determining a network resource allocation plan for the first remote unit and the second remote unit based on the isolation threshold and an isolation level provided by the first remote unit, the network resource allocation plan including an allocation of network resources among the first remote unit and the second remote unit.

10. The non-transitory computer readable medium of claim 9, wherein the network resource allocation plan includes a default plan when the isolation level exceeds the isolation threshold.

11. The non-transitory computer readable medium of claim 9, wherein the first remote unit and the second remote unit are configured to provide wireless communication information within a cell site.

12. The non-transitory computer readable medium of claim 11, wherein the network resource allocation plan includes an allocation of a first subset of network resources to the first remote unit and a second subset of network resources to the second remote unit when the isolation level does not exceed the isolation threshold.

13. The non-transitory computer readable medium of claim 9, wherein the network resource allocation plan includes an allocation of the same network resources among the first remote unit and the second remote unit when the isolation level exceeds the isolation threshold.

14. A distributed antenna system, comprising:
    a head-end unit;
    a first remote unit configured to measure a power level of a test signal received from a second remote unit and determine an isolation level based on the power level, the first remote unit and the second remote unit communicatively coupled to the head-end unit; and
    a self-optimizing network entity communicatively coupled to the head-end unit, the self-optimizing network entity configured to determine a network resource allocation plan for the first remote unit and the second remote unit based on the isolation level, the network resource allocation plan including an allocation of network resources between the first remote unit and the second remote unit,
    wherein the distributed antenna system is configured to transport wireless communication information between a base station and the first remote unit and the second remote unit, wherein the first remote unit is configured to provide the wireless communication information within a first cell site, and wherein the second remote unit is configured to provide the wireless communication information within a second cell site.

15. The distributed antenna system of claim 14, wherein the self-optimizing network entity is further configured to define an isolation threshold indicating a minimum isolation level between the first remote unit and the second remote unit and determine whether the isolation level exceeds the isolation threshold.

16. The distributed antenna system of claim 15, wherein the network resource allocation plan includes a default plan when the isolation level exceeds the isolation threshold.

17. The distributed antenna system of claim 15, wherein the first remote unit and the second remote unit are configured to receive copies of the same signal using the same network resources when the isolation level exceeds the isolation threshold.

18. The distributed antenna system of claim 15, wherein the first remote unit and the second remote unit are configured to radiate signals using the same network resources when the isolation level exceeds the isolation threshold.

19. The distributed antenna system of claim 15, wherein the first remote unit and the second remote unit are configured to radiate signals using different network resources when the isolation level does not exceed the isolation threshold.

20. The distributed antenna system of claim 15, wherein the first remote unit and the second remote unit are configured to radiate copies of a same signal when the isolation level does not exceed the isolation threshold.

* * * * *